United States Patent [19]

Ellis

[11] Patent Number: 4,661,398

[45] Date of Patent: * Apr. 28, 1987

[54] FIRE-BARRIER PLYWOOD

[75] Inventor: Harold Ellis, Miami, Fla.

[73] Assignee: Delphic Research Laboratories, Inc., Miami, Fla.

[ * ] Notice: The portion of the term of this patent subsequent to Feb. 25, 2003 has been disclaimed.

[21] Appl. No.: 638,796

[22] Filed: Aug. 8, 1984

Related U.S. Application Data

[63] Continuation-in-part of Ser. No. 603,799, Apr. 25, 1984, Pat. No. 4,572,862.

[51] Int. Cl.$^4$ ............................ C04B 7/32; C04B 9/00
[52] U.S. Cl. ..................... 428/245; 106/104; 106/105; 106/106; 428/246; 428/248; 428/252; 428/703; 428/920; 428/921
[58] Field of Search ............... 428/245, 246, 248, 249, 428/252, 535, 703, 920, 921; 252/607, 608, 609, 610; 106/18.12, 18.26, 105, 104, 106

[56] References Cited

U.S. PATENT DOCUMENTS

| | | |
|---|---|---|
| 53,092 | 3/1866 | Sorel . |
| 504,211 | 8/1893 | Gallinowsky et al. . |
| 882,774 | 3/1908 | Apfel et al. . |
| 1,442,089 | 10/1921 | Oosterhouse . |
| 1,574,862 | 3/1926 | Benson . |
| 1,916,971 | 7/1933 | Denning . |
| 1,988,125 | 1/1935 | Kidwell . |
| 2,081,935 | 6/1937 | Jones ............................ 106/18 |
| 2,511,904 | 6/1950 | Clasen et al. .................. 106/108 |
| 3,464,543 | 9/1969 | Kwiatanowski et al. ...... 428/921 |
| 3,522,069 | 7/1970 | Checko et al. ................ 106/88 |
| 3,573,941 | 4/1971 | Edwards et al. .............. 106/106 |
| 3,719,512 | 3/1973 | Danielis ......................... 106/106 |
| 3,745,031 | 7/1973 | Kaplin ........................... 106/106 |
| 3,778,304 | 12/1973 | Thompson ..................... 106/106 |
| 3,811,992 | 5/1974 | Handa ............................ 428/921 |
| 3,857,727 | 12/1974 | Benisek .......................... 428/921 |
| 3,897,387 | 7/1975 | O'Shaughnessy ............. 106/18.12 |
| 3,956,538 | 5/1976 | Vartiak .......................... 428/921 |
| 3,963,849 | 6/1976 | Thompson ..................... 428/921 |
| 3,973,978 | 8/1976 | Nakagawa et al. ............ 106/95 |
| 3,996,742 | 12/1976 | White et al. ................... 106/18.26 |
| 4,088,804 | 5/1978 | Cornwell et al. .............. 428/220 |
| 4,107,376 | 8/1978 | Ishikawa ........................ 428/921 |
| 4,111,711 | 9/1978 | Kiehl et al. .................... 106/104 |
| 4,158,570 | 6/1979 | Irwin .............................. 106/106 |
| 4,159,302 | 6/1979 | Grene et al. ................... 428/703 |
| 4,185,066 | 1/1980 | Temple .......................... 106/106 |
| 4,209,339 | 6/1980 | Smith-Johannsen ........... 106/106 |
| 4,255,483 | 3/1981 | Byrd et al. ..................... 428/245 |
| 4,312,674 | 1/1982 | Stalego et al. ................. 106/105 |
| 4,352,694 | 10/1982 | Smith-Johannsen ........... 106/106 |
| 4,353,955 | 10/1982 | Cook .............................. 428/246 |
| 4,371,579 | 2/1983 | McCasley et al. ............. 428/920 |
| 4,410,366 | 10/1983 | Birchall et al. ................ 106/104 |
| 4,462,831 | 7/1984 | Raevsky et al. ............... 428/245 |
| 4,572,862 | 2/1986 | Ellis ............................... 428/245 |

FOREIGN PATENT DOCUMENTS

| | | | |
|---|---|---|---|
| 957455 | 11/1974 | Canada ........................... 106/18.26 |
| A2225391 | 11/1974 | France . | |
| 69252 | of 1981 | Japan . | |
| 1561271 | 2/1980 | United Kingdom ............ 106/106 |
| 1014809 | 4/1983 | U.S.S.R. ........................ 106/105 |

OTHER PUBLICATIONS

Chemical Abstracts (1981), European Search Report.

*Primary Examiner*—George F. Lesmes
*Assistant Examiner*—William M. Atkinson
*Attorney, Agent, or Firm*—Beveridge, DeGrandi & Weilacher

[57] ABSTRACT

A novel method is presented for converting plywood, wall panelling, and laminated sheathing (doorskin, resin-impregnated paper generally termed "Mica", and other combinations of laminated wood and/or wood plastic products) used in construction, into a fire barrier which not only decreases the spread of flame along the surface, but prevents the penetration of flame into the interior of the product and through to the opposite side, and thus enables these products to function as a "fire-barrier" under ordinary fire conditions normally associated with home, apartment, commercial, industrial, ship/boat and aircraft fires.

The method consists of substituting a non-combustible, high temperature-resistant coating, which in itself has adequate adhesive properties to substitute for the presently used adhesives in the laminated wood and wood/-plastic structures, for one or more of the adhesive layers, herein termed the internal or "submerged" coatings. The coating may be used alone, or in the form of an impregnated sheet of woven or non-woven fabric made from fiberglass, carbon, aramid ("Kevlar"), quartz, polyester, nylon, or other natural or synthetic or inorganic fibers. The impregnated fabric adds tensile strength and flexural modulus to the laminate and may be used as the bonding agent (adhesive) alone or in combination with the currently used adhesives (e.g. phenol-formaldehyde, urea formaldehyde, resorcinol, melamine, melamine urea, urea, etc.). The cited examples consist of a synergistic combination of two and three non-combustible inorganic bonding systems: viz. magnesium "oxychloride" or magnesium "oxysulphate" cements, along with high alumina calcium aluminate cement; and with or without colloidal silica. These non-combustible formulations are compatible with some of the currently used plywood phenolic, urea and resorcinol adhesives, and may be mixed together so that only one application and curing cycle is required and still imparts the fire-barrier properties inherent in the coating and coating laminate.

10 Claims, No Drawings

FIRE-BARRIER PLYWOOD

CROSS REFERENCE TO RELATED APPLICATION

This application is a continuation-in-part of application Ser. No. 603,799, filed Apr. 25, 1984 now U.S. Pat. No. 4,572,862 for FIRE BARRIER I. COATINGS, the entire disclosure of which is relied upon and incorporated herein by reference.

BACKGROUND OF THE INVENTION

Although natural wood as a material of construction has many desirable properties, some of its shortcomings, such as its lack of strength in thin layers, and its inherent combustibility, have restricted the scope of its application. The economic necessity of utilizing "waste" subproducts, and the notable product improvement in strength and appearance has led to the widespread use of laminated wood products in the form of plywood, wood panelling, and veneers, such as doorskin, as well as veneer-covered compressed particle and waferboard. Construction and industrial plywoods are widely used for floor, wall and roof sheathing; decorative hardwood plywood is used for interior panelling as well as for furniture and many specialty applications. The 1984 edition of "U.S. Industrial Outlook" reported that the market for wood panel products in 1983 reached $6.6 billion, of which the industrial softwood panels represented 65% of the shipments; hardwood panels represented 25%, and particleboard held 10% of the market. 2.60 billion square feet (surface measure) of hardwood plywood was produced in the U.S.A. in 1983, versus 3.9 billion square feet in 1977 (a reduction of 33%), while an additional 1.48 billion square feet were imported. (Softwood plywood volumes far exceed those of hardwood plywood; viz. over 20 billion square feet per year.)

If one of the major drawbacks to the use of plywood—its flammability—could be economically counteracted without necessitating the use of claddings, fire resistive gypsum wallboard shielding, space isolation, etc. now required by construction codes, the market and applications for plywood would be further extended.

Plywood and panelling is manufactured by bonding together layers (plies) of thin sheets of wood (veneer). The layers are glued together with the grain direction of adjacent layers at right angles. The veneer is usually roatary-peeled from logs, but may also be sliced or sawn. After trimming, drying and grading, the veneers go to glue spreaders, where adhesive is applied and the plywood panel is laid up. The plywood is generally hot-pressed in large multiopening heated hydraulic presses. The application of both heat and pressure cures the glue.

Construction and industrial softwood plywood is made in two types: Interior and Exterior, on the basis of resistance of the panels to moisture, and in thicknesses ranging from ¼" to 1⅛". Decorative hardwood plywood is available in thicknesses from ⅛" to over 2". The standard size of a plywood sheet is 4'×8', but other sizes and thicknesses can be manufactured on special order. Typical plywoods are manufactured in 3 to 5 layers, but with 3 to 6 plies. Although weights will vary with the species of wood used, 5/16" thick unsanded panels weigh approximately 1.0 pound per square foot; ¾" panels weigh 2.2 pounds per square foot; and 1" thick panels weigh 3.0 pounds per square foot. Hardwood plywood is generally a decorative wall paneling product, but is also used structurally, for example, in the structural integrity of mobile and manufactured homes.

Because of plywood's cross-laminated structure, it can support highly concentrated loads, even at unsupported edges. Shear strength varies with the kind of glue used, even though the glue line is very thin—a few mils thick (dry).

Several types of water-dispersable glues are used in plywood bonding, which vary in their resistance to moisture and are one of the bases used for grading as exterior or interior grade. Most glues used are thermosetting, and these vary in the temperature, temperature-time, and temperature-time-pressure required to "cure", as well as "pot-life", "open time", viscosity, "spreadability", and other parameters essential for a suitable bonding agent. Softwood plywoods generally use phenolic adhesives (phenol-formaldehyde); decorative hardwood plywoods generally use urea formaldehyde resins. The phenolic glues, which are highly water-resistant, will cure in 4 to 5 minutes at temperatures as low as 300° F., but they have a short shelf life. The urea formaldehyde adhesives can be catalyzed with ammonium sulphate at 0.5 to 1.0% to bring about a lower temperature cure, and typically require from 150 to 300 psi pressure (depending on the density of the wood species being bonded) at 230° to 260° F. for 3 to 5 minutes. Resorcinol and phenol-rersorcinol resins are highly waterproof, and if properly catalyzed do not require heating for curing—that is, they bond at room temperatures. Paraformaldehyde is a commonly-used catalyst in bringing about the cross-linking reaction. However, in comparison to the phenolics and ureas, they are very expensive, and hence are not used in plywood or panelling lamination, but are used in laminating heavy timbers and beams ("Glulam"). Other widely used laminating adhesives are based on melamines (melamine formaldehyde, melamine urea, etc.), but these are used mainly in furniture decorative laminates, etc.

Most of the glues used are flammable, although some are "self-extinguishing". They impart little fire resistance to the plywood.

The fire hazard associated with the flammability of wood products is the principal limiting factor in the use of laminated woods as a material of construction. Almost all Local, State, and Regional governing bodies have enacted building Codes which regulate the use of wood products in construction, and which dictate other norms for the prevention, early detection, and extinguishment of fires. (Most "advanced" countries also have national building codes.) Some fire-preventive methods are "structural", i.e. isolation of the wood members behind fire barriers; other are "spatial"—separating wood members by "fire breaks"; and still others require the use of sprinkler or water deluge system installations. "Chemical" methods are also available, although not as widely used. These fall into two major categories: (a) Impregnation with fire retardants; or (b) Coating with paints which retard the spread of flame. Both are effective for short periods of time in reducing flame spread, but neither is significantly effective in increasing the resistance of wood to degradation under sustained fire exposure, or in preventing reduction of its load-bearing capacity.

The National Fire Protection Association (NFPA) has established a Standard (#703-1979) for both "Fire Retardant Impregnated Wood" and "Fire Retardant Coatings for Building Materials". The American Wood Preservers Association has a Standard (AWPA C-27) with a requirement for a flamespread of 25 or less, with no evidence of significant progressive combustion when tested for 10 minutes duration under the ASTM E-84 Test Method. "Fire Retardant Treatment of Lumber and Plywood" is also covered by Federal Specification MIL-L-19140 D (Navy). U.S. Federal Specification SS-A-118(b) covers the use of flame retardant coatings on unfinished interior plywood and other construction products.

Impregnation with fire retardant chemicals is an expensive procedure and a complicated process, since, in order to be effective, the chemicals must be applied under pressure in a closed pressure cylinder which requires that a vacuum be pulled first on the load to extract the air from the wood cells prior to pressurization. Chemicals commonly used in this impregnation are water-soluble salts, such as monobasic and dibasic ammonium phosphates, ammonium sulphate, borax, boric acid, zinc chloride, sodium dichromate and combinations thereof. Some of the salts are corrosive to metal fasteners and hardware (nails, screws, bolts, hinges, etc.); some prevent surface painting; some species of wood must be scored to ensure penetration of the treating solution; and being water-soluble, the salts tend to leach out if exposed to weather. American Plywood Association (APA) mandates that allowable stresses be reduced 1/6th, and the modules of elasticity be reduced 1/10th for fire-retardant chemical pressure-impregnated plywood below normal design standards for untreated plywood. In addition, the fire retardant treatment of wood does not prevent the wood from decomposing and charring under fire exposure. The rate of fire penetration through treated wood is approximately the same as for untreated wood.

Fire retardant coatings are also used to reduce the surface flammability of wood and laminated wood products. Prior Art disclosed four major types of fire-protective paints: (1) ablative; (2) intumescent; (3) sublimating and gas- or vapor-producing; and (4) "ceramic", or inorganic. Ablative coatings are generally thick and heavy and costly, thus limiting their application to special uses. Intumescent coatings are generally soft and easily abraded, and have limited duration of protection—10 to 15 minutes—when exposed to fire before the delicate char cracks and is eroded away, leaving the substrate unprotected. They cannot be used internally ("submerged") between the wood plies since their mode of action is inhibited by the glue line bond strength. The adhesive prevents their normal 10 times (or greater) expansion. Sublimative or gas-producing coatings have even shorter duration of protection—after their snuffing gasses have been produced and wafted away, they are left without a protective mechanism. They have found their major use in the treatment of fibers and clothing where only short-term exposure to flame is a major requirement. Ceramic coatings, as the name implies, require high temperature curing in order to form the ceramic bond, which many structural and building wood components cannot withstand. Inorganic coatings, such as Portland Cement, gypsum, calcium aluminate cement, phosphate-bonded cements, silicate coatings, high temperature silicones, and magnesium "oxychloride" and magnesium "oxysulphate" cement coatings have all been proposed.

H. Ellis, in a companion U.S. Letters Patent Application, now pending, entitled "FIRE BARRIER: I. COATINGS", of which this disclosure is an extension, in part, discloses seven type formulations for inorganic coatings, consisting of synergistic combinations of two and three non-combustible inorganic bonding systems which efficiently prevent flame spread on the surface of susceptible substrates, and at the same time prevent flame from penetrating through the substrate.

The American Society for Testing Materials (ASTM) has issued a series of Standard Test Methods for evaluating the protective abilities of fire retardant coatings and constructions (E-119, "Fire Tests of Building Construction and Materials"; D-3806, "Small Scale Evaluation of Fire Retardant Paints (2-Foot Tunnel Method)"; E-286, "Surface Flammability of Building Materials Using an 8-Foot Tunnel Furnace".) E-84, a 25-Foot "Tunnel" test (the most widely accepted test), has its counterpart in Underwriters' Laboratories (UL) #723; and the National Fire Protection Association (NFPA) #25 test methods. The tests determine the protection a coating affords its substrate; and the comparative burning characteristics of coatings by evaluating flame spread over the surface when ignited under controlled laboratory conditions. The different tests are not comparable, although the results are correlatable. None of them describe or apprise the fire hazard of assemblies under actual fire conditions, but the results are usable as an element in fire-risk assessment.

The tests also give the basis for classifying the performance of the coatings based on their Flame Spread Index Values into Class A, (or I), Class B (or II), and Class C (or III), used by most Building Codes. Index value classification depends on flame spread of the candidate fire retardant coated products or materials of construction, in comparison to known standards. Asbestos-cement board is arbitrarily rated at 0 flame spread; Red Oak lumber is rate at 100. Materials with the lowest rate of flame spread (0–25) are classified as Class I, and are permitted in areas where fire hazard is most severe (such as exitways of unsprinklered buildings); materials with rates from 26 to 75 are Class II, and are permitted in areas of intermediate severity; materials rated 76 to 200 (such as PS-1 uncoated construction plywood) are Class III, and are permitted in most rooms when suitably protected by other design factors. Hospitals, institutions, and buildings of public gatherings require Class I products or fire-protective barriers. There is also a Class D (or IV), with Index Values of from 201 to 500, and a Class E (or V), with Index Values of over 500.

Most untreated softwood plywoods and decorative hardwood plywoods fall into Class III, but this varies, depending on wood species, thickness, and glue type. These types of plywood constitute by far the great majority of laminated wood boards. Therefore, they are accepted for interior finish only, and not for exitways. If they could be upgraded to Class I economically, the range of their potential application would be extended considerably. The market for these products would also be considerably enlarged by the resulting savings in associated construction costs.

In evaluating fire safety of laminated wood structures, two types of fire propagation must be considered: flame spread, and fire resistance.

Flame Spread—a measurement of the maximum extension of the flame on a sample—is a property of the surface material once fire has started, not of the structure. (Under test conditions, it is a ratio, not inches, versus the arbitrary standards). Flame spread is an indication of how fast fire can extend over a room's surface, but says little about the third dimension of fire spread, i.e. the depth of fire penetration through the substrate. Most of the fire retardant coatings influence only the flame spread rate, that is, they function to lower the lateral extension of the flaming surface per unit of time, but have little influence on the "Burn-Through Rate", since the coatings are a surface application. One exception to this statement is the disclosure in the Ellis Patent Application referred to above, in which the surface coating prevents the ignition of the substrate so that a carbonized insulative char forms under the coating—pyrolysis without flame—and in an area restricted to the immediate zone of the initial fire.

Fire Endurance (or, Resistance) is "The resistance against fire penetrating a wall, floor, or roof, either directly or through a high rate of heat transfer that might cause combustible materials to be ignited on the 'cold' side of the wall away from the actual fire". In short, it indicates the ability to resist "burn-through" and measures the containment of the fire within a room or building. The standard test for measuring fire resistance is ASTM E-119; and resistance rating is expressed in the hours or the minutes that the construction withstands the test.

The disclosure presented herein defines a novel method for increasing significantly the "fire endurance" of laminated wooden structures, and for decreasing significantly (if not completely preventing) flame spread in these laminated structures by interposing a non-flammable high temperature resistant coating, in a variety of arrangements, between the plies of the laminate, and, optionally, on the surface of the "plywood".

OBJECTIVES OF THE INVENTION

The prime objective of this invention is to impart to the various types of laminated wood products generally termed "plywoods", which term includes panelling, doorskin, and other structures composed of multi-layered veneers, sufficient fire retardancy so that by themselves, without the need of other structural barriers, they form a fire barrier to both surface flame spread and burn-through (fire endurance), in short, develop a fire-barrier plywood which meets the requirements for a Class I (or A) fire retardancy classification, and thus permit the use of these materials in those situations now barred to their use by fire hazards or construction code restraints. By obviating the necessity of using supplemental fire barriers, such as claddings, gypsum wallboard, and other structural alternatives; the use of fire barrier plywoods could lower construction costs, simplify design, decrease weight, add usable space to a structure, and lower insurance rates.

Another objective is to overcome the deficiencies of the currently-used alternative systems for imparting fire retardancy to plywoods; viz., pressure-impregnating the entire mass of the wood with fire retardant salts and resins, or surface coating alone with fire retardant paints and mastics. The use of pressure-impregnated salts is costly, more than doubling the price of untreated plywood; reduces the allowable stress limits by 16% and modulus of elasticity by 10%; may be corrosive to metals; and is water-leachable, thus restricting their outdoor use. Surface coatings are effective for only limited periods of time when exposed to fire; are usually soft and easily abradable; are usually applied on site after the installation, hence only cover the exposed, easily reached areas; and are effective mainly against surface flame spread for limited periods of time. Their efficiency in preventing burn-through is highly variable, and of relatively short duration.

Still another objective is to develop a fire barrier coating which is relatively inexpensive, simple to apply, and which requires little modification of the procedures or equipment presently used in the manufacture of plywood.

Another objective is to develop a fire barrier coating which in itself has sufficient adhesion to the various woods used in plywood construction to substitute for the currently used bonding glues, and/or be compatible with those glues, so that they may be applied together utilizing existing equipment.

Still other objectives will become evident as the teachings of this invention are disclosed.

DESCRIPTION OF THE INVENTION

Ellis, in his companion U.S. Application entitled "FIRE BARRIER: I, COATINGS" describes a series of tests (Table II, p.1–p.3 and q.1) in which a non-combustible inorganic coating was applied between two pieces of 3-ply laminated plywood, and between two and four plies of doorskin, using the coating as the bonding agent (adhesive) for the layups. Results were unexpected, and highly successful. Surface flame spread, even on uncoated surfaces, was limited to little more than the contact area of the flame source, when exposed to a direct 1950° F. propane torch flame, or subjected to the Standard ASTM-D-3806, 2-Foot Tunnel test; "burn-through" was prevented, and the flame did not extend to a depth greater than the level of the nearest layer of internal "submerged" coating. In addition to markedly increasing the "fire resistance" of the panels, the "submerged" coating layer was found to influence and limit the surface flame spread. The closer the "submerged" layer was to the surface, the smaller the extent of flame spread. The coating served as an excellent adhesive between the wood plies, and the bond did not delaminate under the heat from either the propane torch nor the gas flame (approximately 1900° to 2050° F.). Additionally, the coating can be tinted to match the color of the wood plies, so that the "glue line" is not apparent.

This invention extends the referenced Ellis disclosure and broadens its applicability. The results from a specific type coating formulation have been expanded into a general model for a fire barrier system for plywood and other laminated wood products, applicable to most types of non-combustible coatings.

The general description of the Invention is applicable to all types of plywoods and panelling.

The Barrier Coating. Although specific embodiments of a non-flammable, inorganic, high temperature resistant coating, which can be applied to the wood plies by any method known to the Art, viz. by brushing, spraying, rolling, roller-coating, are described by Ellis in his co-pending Application. This disclosure contemplates that any formulation which meets these criteria could be used to form the fire barrier layer.

The coating layer can be applied between one or several, or all of the plies, while the laminate is being laid up, prior to pressing and heat curing. It can also be applied to, or can be used to bond, two traditionally bonded multiple-ply layups. In addition, the coating can be applied to the front or top surface, and/or to the rear or lower surface of the laminate. At any of these levels—top, intermediate, or bottom—the coating influences and/or prevents flame spread and fire penetration.

The coating can be used alone as the adhesive or bonding agent, since it bonds tenaciously to the wood fibers. The length of time required for cure is a function of the specific coating formulation and the temperature. In the exemplary formulation discussed herein (a synergistic combination of two or three bonding systems; viz. magnesium oxide/magnesium chloride, high alumina calcium aluminate cement, and a colloidal silica—optional—) the coating normally requires two hours to set at ambient temperature, but can be accelerated to 45 minutes at 120° F. The coating, consisting of both hydraulically-setting and chemical-setting systems, can cure anaerobically—without access to air, and hence can cure when layered between the plies of the laminate. The coatings are easily sawed, nailed, or screwed.

The thickness of the coating can be varied at will from a few mils to 1/16" thick. The thicker the coating, the better the fire-barrier performance. The greater the number of plies to be coated, the thinner each glue line needs to be.

The fluid coating can also be applied in the form of an impregnated fabric. Bonding peel strengths are equivalent. When using impregnated fabric, the glue line is thicker (on the order of 1/32" to 1/16") since the fabric holds more coating material. The fabrics add significantly to the flexural strength of the laminate. Fabrics which have been successfully used to date are: non-woven, spunbonded and needled polyester fabrics (geo-textiles) in several weights (2.0 to 4.0 ounces per square yard); non-woven fiberglass veil; woven fiberglass; woven carbon cloth; and woven aramid fabric ("Kevlar"). Fabrics of quartz, nylon, or other natural or synthetic or inorganic fibers could also be utilized. The coating-saturated fabric cures at the same rate as the coating alone.

Where a specific non-combustible coating does not have the required bonding strength to a wood species veneer (ply), and if it is desirable to use conventional bonding adhesives, the coating may still be used as the fire barrier layer. The impregnated fabric referred to above, is air cured into a flat rigid sheet and trimmed to proper size. It may have a smooth surface by curing between release paper, or left with a matte finish by being cured uncovered. All of the commonly used plywood adhesives (phenol formaldehyde, urea formaldehyde, melamines, resorcinol, and phenol resorcinol) show excellent adhesion to the type coatings discussed herein, and would probably show similar adhesion to other cementitious coatings. The cured coating and carrier fabric is laid up between the wood plies, using an adhesive layer on both surfaces, and conventionally bonded by pressure and the heating cycle required of the adhesive.

Finally, the bond or glue line between the wood plies may be a mixture of conventional plywood adhesives and the non-combustible coating. All of the wood adhesives referred to above are compatible with the type aqueous-based non-combustible coating which is described herein. To 80-85% by weight of the freshly-prepared coating is added, with adequate mixing, 15 to 20% by weight of the selected adhesive, and the mix spread or applied to the wood plies in the conventional manner. The hybrid system requires a different time/-temperature cure cycle for each of its major components. If the phenolic or urea adhesives are cured under their typical press cycles prior to the cure of the coating, the fluid of the coating boils off and all cementitious properties (as well as fire-barrier properties) are lost. Hence, the coating is permitted to cure first, although the cure may be accelerated by slight heating to 110°–120° F. (or by adding known accelerators for both the MgO—MgCl$_2$ and calcium aluminate systems). After the coating cures (1 to 2 hours) as stated above, curing can take place "anaerobically" (without exposure to air) under the laid-up plies of the laminate, the remainder of the hybrid system is subjected to the time-temperature-pressure curve of the adhesive component. As noted above, the resorcinol adhesives do not require a heating cycle, so if they are used, the normal pressure lamination process serves for both the adhesive and the coating components.

This hybrid bonding system adds water repellency and enhanced adhesion to the coating without detracting from the latter's fire barrier properties.

The function of the coating, whether applied to the surface of the plywood panel, or applied as a "submerged" layer between one or several or all of the plies, is to present an unbroken non-combustible barrier to the flame front, and thus prevent the ignition of the substrate to which it is applied. The coating is not primarily an insulation, since, with time, conductive heat transfer will bring the substrate temperature near to that of the heat source, if the heat source remains constant and does not die out due to lack of fresh fuel in the immediate area of the initial flame. Those coatings which contain molecularly-bound "water of hydration" serve as an insulation maintaining the substrate at a temperature no higher than 570° F., until all of the water has been driven off—a period of time which depends upon the thickness of the coating. The energy required for this release is approximately 1000 BTU's per pound of water released. The coatings may contain from 40 to 54% by weight of this bound water. Until spontaneous auto-ignition temperature of the wood is reached (approximately 650° F. [340° C.] for 1 hour), in the absence of an igniting flame touching the surface, the substrate will pyrolyze and char, but will not ignite and will not support surface flame nor burn-through. The char itself acts as an insulation, and resists temperature changes to the underlying wood—which is important for strength retention. In Douglas Fir, the char base equilibrates at 550° F. (288° C.), well below the auto-ignition temperature of the wood. One quarter inch ($\frac{1}{4}$") inward from the char, the maximum temperature reached is 360° F. (182° C.), and at one half inch ($\frac{1}{2}$") inward, the maximum temperature is 200° F. (93° C.). This illustrates the importance of maintaining a cohesive coating which prevents flame from igniting the substrate.

Many types of non-combustible mostly inorganic coatings based on either hydraulic or chemical setting are capable of performing this function, and meeting the other performance parameters required for a satisfactory coating. These are well known in the Art, and many variations and combinations are possible. Among the types of coatings may be mentioned those based on Portland Cement, high alumina calcium aluminate cement, magnesium "oxychloride" and magnesium "oxysulphate"; calcium sulphate (Plaster of Paris), magnesium phosphates, alumina, silicas and silicates, such as colloidal silicas and sodium, potassium, ammonium, and "organic" silicates, refractory compositions, and a wide variety of phosphate-bonded cementitious compounds.

Ellis (1984) in the co-Pending U.S. patent application Ser. No. 603,799, filed Apr. 25, 1984, entitled "FIRE- BARRIER: I, COATINGS", referred to above, discloses the following composition, (Type II), as being one type of coating satisfactory for both surface application and "submerged" application, i.e., used either on the top or bottom of the plywood, and between the plies of wood laminates, when applied either alone or as an impregnated fabric. He discusses in detail the materials specifications and behavior for each ingredient. He also discloses six other formulations, all of which would also be satisfactory in this laminated plywood application. These coatings are the result of a synergistic reaction between two disparate binding systems, in which the stoichiometric imbalance between the magnesium oxide and magnesium chloride, caused by the need for sufficient fluidity in the mix to enable this subsystem to be applied as a paint or coating is compensated for by the high alumina calcium aluminate cement utilizing this excess liquid as its "water of hydration". The excess magnesium chloride solution, if not otherwise utilized, would normally lead to a film disruption (cracking and crazing), salt efflorescence, and a weak, soft coating. In these formulations, the $MgCl_2$ solution is "sopped-up" by the calcium aluminate binding system. The two binding systems complement each other, and retain their bond strength and coating integrity over different temperature ranges which span the normal fire cycle of 1800° to 1950° F.

| TYPE FORMULATION NO II. | | |
|---|---|---|
| Part "A": | Binder Components - Powders: | |
| | Magnesium Oxide (MgO)[1] | 400 grams |
| | High Alumina Calcium Aluminate Cement[2] | 100 grams |
| | Silica Flour[3] | 100 grams |
| | Titanium Dioxide $(TiO_2)$[4] | 15 grams |
| Part "B": | Gauging or Activator Components - Liquids: | |
| | Magnesium Chloride Solution[5] | 440 c.c. |
| | (Optional) Niaproof No. 4 Anionic Surfactant[6] | 4.0 c.c. |

[1] "OXYMAG" or "MAGOX 98 LR" Grades from BASIC CHEMICALS, INC. (98% MgO)
[2] "CA-25" from ALCOA, or "SECAR 80" from LONE STAR LAFARGE, INC. (80% $Al_2O_3$, 18% CaO.)
[3] Standard commercial commodity.
[4] Standard commercial commodity.
[5] $MgCl_2$ Solution, 1.26 sp. gr. (30° Baume') prepared from DOW CHEMICAL CO. Tech. grade Flake.
[6] 27% solution of sodium tetradecyl sulphate from NIACET CORP., Niagara Falls, N.Y.

The yield from this batch size is 700 c.c. In the FORMULATION NO. II, presented above, Part "A" is aded to Part "B" with adequate mixing to the consistency of a house paint, and applied by brushing, spraying, roller coating, or flooding to yield the desired dried thickness. The fluid paint has a specific gravity of 1.71, and weighs 14.26 pounds per gallon.

The coating develops an initial set in 1 hour, and a final set in 2 to 2½ hours, and maximum strength in 24 hours. It dries crack-free. It is brilliant white, with high infrared radiation reflectivity. Since the dominant mode of heat transfer of a fire is by radiation, the difference between a white reflective surface (emittance of approximately 0.8) and a dull absorptive surface (emittance 0.3) results in a lowering of the surface temperature of several hundred degrees (at the 1900°–2000° F. range) in the former. Where the surface of the plywood is coated with this white paint, this surface directly faces the fire. Where the coatings are "submerged" and placed between the plies, as the top ply is burned off, it exposes the bright white coating underneath.

Usually two coats are applied to the surface, although one is adequate if an internal or "submerged" coating is also applied. The coating has a relatively low heat conductivity, and thus acts as a thermal insulator for a short period of time. There is little lateral spread of heat when exposed to the direct impingement of a 1950° F. propane flame source of 1" diameter. The zone of influence, or halo (or penumbra), of 500° to 550° F. extends, after 15-minute exposure, only an additional 1" to 1½" in diameter, beyond which the temperature does not exceed 180° to 200° F.

The coating used alone or impregnated into one of the fabrics listed previously, when cured, forms a hard highly abrasion-resistant ceramic-like layer (Mohs hardness of 5.5). It conforms with exquisite detail to the surface of the wood substrate, and bonds tenaciously. The surface coating can also be tinted any desired color, or overprinted with a pattern; or top-covered with wall paper on the surface. The coating may be cured smooth and glistening (glabrous) or with a matte finish. Coating-impregnated woven fabrics (such as fiberglass fabric) have a pleasant decorative appearance. Surface coatings may be "field-applied", i.e. after panel installation, and handled as a special paint application, or factory-applied coatings can be "touched-up" after installation to repair any damage.

When exposed to flame, the coating retains its integrity during the heat-up and exposure periods. Occasionally, depending on the speed of cool-down, it will show one or two stress-relieving cracks. After 15 to 20 minutes' exposure to the direct flame -at a temperature of approximately 2000° to 2200° F.—the coating will show signs of calcination, but it still retains its integrity. The softer calcined areas can be scraped away, but they do not peel nor flake off on their own accord.

When coated onto or impregnated into a natural fiber or synthetic resin woven or non-woven fabric, such as spunbond polyester, under the 1950° F. propane torch for 30 to 60 minutes, the fabric does not combust, and there is zero flame spread from the area of the cone of impingement of the flame. The organic fabrics pyrolyze into a carbonized skeleton within the ennobling coating (and fiberglass melts), but the structural strength of the coating holds the fabric together, and the flame does not penetrate to the opposite side of the barrier. The fabric serves both as a stroma, or supporting framework, and as a network of stress-relief foci. The numerous minute fibrils interlock with the crystallites as they form, leaving compressible points at which the volumetric changes associated with the heat-engendered phase changes in the cements have an opportunity to release their thermodynamic energies. They also serve to increase significantly the tensile strength and flexured modulus of the laminated plywood.

A variety of types of laminated wood construction were fabricated using the inorganic high-temperature resistant non-combustible coating referred to above: (a) the coating alone, or the coating-impregnated woven or non-woven fabric applied to the top or exposed surface of ⅛", ¼", ½" and ⅝"-thick standard interior/exterior plywood; and ⅛"doorskin; (b) The coating alone, or coating-impregnated woven or non-woven fabric applied to the bottom or unexposed surface of these same products; (c) two, three, and four pieces of ¼", ⅜" and ½" plywood, and ⅛" doorskin and ¼"-thick wall panelling were utilized as "plies" and bonded together with the coating, or the coating-impregnated fabric as the adhesive, and cured "anaerobically" at ambient temperatures in a press under slight pressure (20 to 30 psi). [Each of the "plies" in these laminations actually consisted of a standard 3-, 4-, or 5-ply plywood, or doorskin bonded together with a standard thermosetting organic resin adhesives]; (d) two and three pieces of $\frac{1}{4}''$ 3-ply plywood bonded together using GEORGIA-PACIFIC GP 1948, urea-formaldehyde resin adhesive with ammonium sulphate catalyst at 1% concentration, under 100 psi pressure, at 300° F. for 4 minutes, sandwiching between each two pieces of plywood a cured coating-impregnated non-woven 3.0 oz. per square yard spunbond polyester geotextile as the "submerged" coating layer; (e) top-surface coating applied to "submerged" coating bonded laminates; and (f) bottom-surface coating applied to "submerged" coating-bonded laminates. (This latter was intended to function as the "final" barrier to prevent ignition and burn-through to any other substrate, e.g. roof sheathing subflooring, wall partitions, and etc.)

Two types of fire exposure tests were performed: (a) the propane torch test: The hottest part of the high-velocity 1950° F. flame was directed against the candidate coated sample, usually $9'' \times 9''$, or $12'' \times 12''$ in size, or its uncoated control. The samples were mounted free standing at a 15% inclination off the vertical, and held steady in a test bracket for the test duration, which extended for as long as 60 minutes. Readings were taken every minute of the temperatures on the back, signs of discoloration, amount of smoke generated, evidence of coating cracking, surface burning, burn-through and temperature peripherally from the center of the flame contact; and (b) ASTM D-3806 "Small Scale Evaluation of Fire Retardant Paints (2-Foot Tunnel Method)". These were certified tests run by Applied Research Laboratories (ARL) of Miami, Fla., on 2-foot-long by 4"-wide test panels. This test consists of impinging directly onto the surface coating a 2000° F. gas flame supplying heat, at 5085 BUT's per hour, for 5 minutes, while the test panel is suspended above the burner, coated surface facing downward, at an upward angle, in a chamber. The angle of the test panel, and the draft of the chamber, encourages any flame in the coating and substrate initiated from the burner to proceed upward along the substrate. The extent of this flame front is measured and compared with the known substrate standards (0 and 100). In addition to flame spread, the smoke density, fuel contributed, and weight loss are loss recorded and calculated. Although this test is mainly concerned with flame spread along the surface, weight loss and visual inspection and depth measurement shows for endurance (resistance, or burn-through protection).

Flame spread is the main factor associated with testing fire-retardant coatings. The "fire-retardant" coatings currently available are rated as low as 10, or as high as 60 or 70. The lower the rating, the longer the coating will retard flame.

The following examples show that under the test conditions: (a) when high-temperature inorganic non-flammable coatings or coating-impregnated fabrics are applied to the front or "hot" surface of a laminated wood product (plywoods), they are capable of achieving zero (0) flame spread, as well as zero (0) smoke density, and zero (0) fuel contributed; and of stopping, or considerably slowing down, fire penetration. This latter is a function of flame exposure time. In a 5-minute test there is little penetration. In a 15 or 20-minute test, there is substrate charring but no flaming; (b) coatings or coating-impregnated fabrics applied to the rear, or "cold" surface of a laminated wood product, at a depth of $\frac{3}{8}''$ to $\frac{1}{2}''$ below the front surface, prevents flame from reaching the substrate on which it may be mounted, limits the burn-through area to a circle of only a couple of inches in diameter; and influences surface flame spread by restricting it to an area only slightly larger than the burn-through circle; (c) one or several internal or submerged coating layers—coatings alone, or coating-impregnated fabrics between the wood plies, are highly effective in preventing fire penetration and burn-through. The flame is usually stopped by the first coating layer; continued flame exposure leaves a char behind that first coating layer. If not stopped by the first layer, flame penetration is stopped by the second coating layer. Even in exposures for as long as 60 minutes in the normally highly combustible doorskin laminates, made up of four layers of doorskin $\frac{1}{8}''$ thick, with 3 layers of coating along between the plies, the flame did not penetrate to the rear surface. Moreover, the flame spread on the surface, as well as the hole which did penetrate to the second layer of coating, was restricted to 2" to $2\frac{1}{2}''$ in diameter. As a general rule, when the surface is uncoated, the closer the first layer of internal or submerged coating is to the surface of the panel, the greater its effectiveness in decreasing surface flame spread. (d) a surface coating backed up by one or two internal coats at $\frac{1}{8}''$ to $\frac{1}{4}''$ depth below the surface coat yielded substantially zero (0) surface flame spread, and a minimum of flame penetration.

The coatings and the coating-impregnated fabrics, applied to the rear of the panels, almost always retained their integrity, remaining whole, and prevented flame from penetrating through to the space on the other side. In practice, this would prevent a chimney effect involving spaces between studs; and if applied to roofing shingles, would prevent ignition of the roofing sheathing. In addition, this rear coating may obviate the necessity for utilizing gypsum wallboard as a rear fire-barrier.

An additional advantage of the coating systems is that by greatly reducing flame spread and penetration, they decidely decrease smoke emission.

EXAMPLES AND TEST RESULTS

EXAMPLE I.

(Surface Coating Alone)

A batch of Type Formulation No. II paint, as given above was prepared and used to brush coat the surface of a $6'' \times 15'' \times \frac{3}{8}''$-thick interior/exterior plywood board. Two coatings were applied, on successive days. Total dry thickness of the coats was 16 mils. The adhesion between the two coats was excellent, and no line of demarcation could be noted. The coating was permitted to cure for two days prior to testing. The sample and its uncoated control were submitted to Propane Torch tests, as described above.

Uncoated Control Panel: Within 20 seconds after application of the flame, the uncoated board caught fire. The surface flamed in all directions, quickly extending to a diameter of 5" from the epicenter, but principally upward from the point of the torch impact, and continued burning on the surface as well as progressively deeper. The panel completely burned through in three minutes. With the torch removed after 3 minutes, the panel continued to burn both on the surface and through all layers of the complete panel depth. The result was a mass of charred, cracked pieces and some ash—almost complete combustion in the upper 7" of the panel prior to extinguishing the flaming brand.

Surface Coated Panel: For the first five minutes of torch application, results were minimal and hardly noticeable. The coating held its integrity, and there was zero flame spread on the surface, and no noticeable changes in the substrate. Temperature on the rear surface was about 15° F. above ambient of 76° F. The coating showed signs of calcination only in the 1" diameter area directly under the flame, and in an additional 1" penumbra around the central core—i.e., for a total diameter of 3". At 6 minutes, the substrate wood showed signs of carbonizing (pyrolysis), and thin wisps of smoke emerged, but there was no ignition, nor combustion. This initial "smoking" is principally due to moisture vapor (steam) being driven off during the heating from both the coating (water of hydration) and from the substrate (adsorbed moisture). Smoke became slightly more dense as the adhesive pyrolyzed, and the smoke density increased up to the 10-minute mark, after which it decreased. The depth of carbonization gradually progressed. At 12 minutes there was the first indication of a slight browning on the back of the board, whch increased only slightly until the end of the 15-minute test period. At no time was there any ignition or combustion of the substrate. There was zero surface flame spread. The surface area affected was limited to the 3" diameter of calcined coating, beyond which the coating was entirely unaffected. The coating continued to adhere well to the substrate without indication of debonding. The pyrolyzed area under the point of flame impingement was likewise limited to the approximately 3" diameter directly under the area of the surface flame application. There was no further spread.

This test was replicated several times with essentially similar results. Some tests were run for 20 and 30 minutes. The only noticeable changes were a progressive increase in the depth of carbonization, until full charring on the rear. Continued exposure to the constant 1950° F. propane torch flame finally results, at approximately 28 to 30 minutes, in "burn-through", in which the char itself fractures and finally ignites in the limited area under the flame. However, there is still no further extension of surface flame spread.

This test demonstrates that surface coating alone, using a high temperature non-combustible "paint", with adequate cohesive strength to withstand the thermal stresses without cracking, and the adhesive strength not to de-bond, could be used as a fire-barrier in preventing both surface flame spread and flame penetration. This test is more severe than that encountered in actual fire situations in that under fire conditions it is unlikely that the flame source would be either this intense or concentrated in such a small area, or for such a prolonged period of time.

EXAMPLE I. A.

(Single Coat Impregnated Polyester Geotextile)

Two 24"×4"×¼" pieces of interior/exterior 3-ply laminated plywood were subjected to the ASTM D-3806 test for a 5-minute burn. Tests were performed by an independent test laboratory (Applied Research Laboratories of Miami, Fla.) (ARL).

One coat of Type II Formulation Paint was brushed-applied to the surface of one panel, and a layer of 3.0 oz. HOECHST spunbond non-woven polyester fabric laid into the coating, which impregnated and ennobled the fabric. The other panel was left as the uncoated control.

Uncoated Control: Flame spread was 73.0; percent weight loss, 58.6%; Smoke density, 543.4. After burn, remnants were a few broken pieces of charcoal, carbonized throughout.

Coated Panel: Flame spread was zero (0); percent weight loss 3.0% smoke density, 9.2%.

The weight loss was due to a loss of moisture in the panel, and the smoke due mainly to the development of steam, since there was no carbonization of the substrate, which showed practically no change in this severe (2000° F. direct-flame impingement for 5 minutes) but limited time test.

EXAMPLE I. B.

(Single Surface Coating-Impregnated Polyester Geotextile)

Coated Panel: 12"×12"×½" 5-ply interior/exterior plywood. HOECHST spunbond polyester geotextile 3.0 oz. per square yard, impregnated with Type II formulation coating, applied to the surface of the panel. Tested with Propane Torch. Steam started to emerge at 3½ minutes; no decrepidation of coating; at 5 minutes, the coating was "white hot", at 7 minutes the coating had calcined, but did not crack under the area of the flame. Slight smoke emission. At 10 minutes, heavy smoke emission. Carbonization under the flame was ¼" deep. No substrate flaming. Zero surface flame spread, and no surface flaming. Subsurface carbonization was restricted to the area directly under the flame (1½" dia.) and a penumbral area of an additional 1' diameter—a total of 3½" in diameter. Test was stopped at 10 minutes.

The impregnated fabric had served as an effective fire-barrier for both the surface and the substrate.

EXAMPLE II (Coating Alone Applied to Rear of Wood Wall Panelling)

Two coats of Type II formulation coating, applied to the rear surface of 24"×4"×5/32" wood wall panelling (GEORGIA-PACIFIC, 3-ply untreated "Cedar Hollow" simulated wood grain printed finish), totalling 1 gram of dried paint per square inch of surface. This panel and its uncoated control were subjected to a 5-minute ASTM-D-3806 flame test by Applied Research Laboratories (ARL) of Miami, Fla. Flame was applied to the front (printed finish) surface.

Results were as follows:

Uncoated Control: Flame Spread 69.0; percent weight loss, 77.79%; Smoke density, 584.2%; fuel contributed, 58.6.

Coated Specimen: Flame Spread, 28.9; percent weight loss, 13.22%; smoke density 71.1%; fuel contributed, 0.

This test indicated that applying the coating to the rear of the panel, at a depth 5/32" below the surface, was capable of affecting and decreasing surface flame spread, as well as the depth of flame penetration.

EXAMPLE II A.

(Coating Impregnated Fabric on Front Surface of Wood Wall Panelling)

This test was a continuation of Example II. Another 24"×4"×5/32" piece of the same type of wall panelling was coated on the front surface with a 6-oz. per square yard open-weave fiberglass fabric, impregnated with the same coating formulation, and subjected to a 5-minute ASTM D-3806 flame test. The flame was applied to the rear (uncoated) surface.

Results were: Flame Spread, 33.4; percent weight los, 15.05%; Smoke Density, 19.7%; fuel contributed, 0.

Except for the significantly lower smoke density attributed to the fact that the printed grain finish on the flat surface was not being burned, the results were similar to Example II. This test tends to confirm the observation that a fire-barrier coating on the opposite side of a panel aids in slowing down flame spread on a surface.

EXAMPLE III.

(Coating Alone, Used to Laminate Two Pieces of Plywood)

Two pieces of $\frac{1}{4}$"-thick, 3-ply, interior/exterior plywood, 12"×12", were laminated together using Type II paint formulation as the bonding adhesive, in a layer approximately $\frac{1}{8}$" thick. The coating was tinted with American HOECHST 17-3031 Colonyl Caramel FK pigment, to yield a pine yellow color, which so matched the color of the plywood that the combination fire-barrier and bonding layer was indistinguishable from that of the plywood laminate. The coating made a superb adhesive, forming a strong bond between the two plywood panels.

The panel was exposed to the Propane Torch test. The surface of the wood ignited immediately and burned, but the burning was restricted to a zone 2" to 3" in diameter around the flame tip. The burning continued carbonizing the three top lamina of plywood, and reached the coating layer in four minutes. The coating layer was not penetrated by the flame, and for the next 10 minutes, there was no combustion of the panel behind the barrier coating. There was a gradual carbonization (but no flaming, and no flame spread) of this second plywood sheet. Testing continued for 15 minutes, with no further changes.

The coating bond did not delaminate under the influence of the heat of the propane torch, and did not crack. The buried (or submerged) coating had prevented the burn-through of the panel.

EXAMPLE III A.

Coating-Impregnated Fabric Used to Laminate Two Pieces of Plywood)

A companion test to EXAMPLE III. Two 12"×12"×$\frac{1}{4}$" 3-ply interior/exterior plywood pieces were bonded together using a 12"×12" piece of HOECHST spunbond non-woven 3.0 oz. per square yard polyester, impregnated with Type II Formulation paint as the bonding agent. This served as an excellent adhesive, forming a bond which showed no line of separation even after the joined panel was subjected to heavy hammer blows.

The panel was tested by the Propane Torch method. Results were similar to EXAMPLE III. Combustion was restricted to the top panels only, and the flame spread restricted to a 3½" to 4" diameter circle. Flame penetration did not extend below the coating layer.

This test again demonstrated that the coating serves as an efficient fire barrier to prevent burn-through in laminated plywood.

EXAMPLE III B.

(Coating Alone Used to Laminate Two Pieces of Plywood)

Two pieces of interior/exterior plywood, 24"×4" were bonded together. One piece was $\frac{1}{4}$" thick (3-ply); the other piece was $\frac{1}{2}$" thick (4-ply) using Type II Formulation coating as the adhesive.

Two similar sets were constructed, with the same quantity of coating in each set.

Both sets were subjected to the ASTM-D-3806 5-minute burn test by Applied Research Laboratories of Miami, Fla.

The objective was to study the influence of the "submerged" barrier coating on flame spread and the influence of the nearness to the surface of this coating on that flame spread. Other tests had shown that barrier coatings on the rear of a panel limited the flame spread on the uncoated surface. Hence, in one set, the flame was applied to the $\frac{1}{4}$"-thick panel surface; in the other set, the flame was applied to the $\frac{1}{2}$"-thick panel surface.

The results were as follows:

|  | $\frac{1}{4}$" Panel Surface | $\frac{1}{2}$" Panel Surface |
| --- | --- | --- |
| Flame Spread | 33.4 | 69.0 |
| Percent Weight Loss | 4.41% | 6.99% |
| Smoke Density | 132.9% | 69.7% |
| Fuel Contributed | 0 | 6.9% |

In both cases, the flame did not penetrate through the submerged coating layer, and the coating did not debond under the heat of the test. The $\frac{1}{4}$" panel surface showed flame scorch on only one-half of the panel length; the $\frac{1}{2}$" panel surface showed flame scorch over the entire length of the panel.

The test indicates that the closer the coating is to the surface, the greater the flame spread protection.

EXAMPLE IV.

(Coating Applied Between Two and Four Pieces of Doorskin)

Two and four pieces of 3-ply veneer doorskin, 8"×8", were bonded together using Type II formulation between each of the layers as the adhesive. The two-piece unit made a panel 5/16" thick; the 4-piece unit made a panel $\frac{1}{2}$" thick. Uncoated control panels were made by using doorskin stapled together with a staple gun. Both were subjected several times to the Propane Torch test.

Control panels: The dookskin was highly flammable. Within 20 to 30 seconds of applying the torch, they ignited and were completely consumed by flame within 3 to 5 minutes, leaving a few scraps of carbonized charcoal.

Two-layer Doorskin Sample: The flame quickly punched a 1" diameter hole through the top layer, until it reached the barrier coating. No flame spread beyond the 1" diameter additional penumbra. Flame was effectively stopped by the coating. On a 25-minute test the rear of the panel gradually carbonized, but did not flame; the coating while "white-hot" remained intact and did not crack; paper placed on the opposite side of the coating scorched, but did not flame.

Four-layer Doorskin Sample: The flame punched a 1"-diameter hole through the top layer, which with time enlarged to 3" diameter; flame was stopped by the first barrier coating layer; the second layer of veneer carbonized under the first barrier coating, but did not flame nor combust. A total of 46 minutes was required for the rear surface to be carbonized, but at no time during the test did the second, third or fourth layers combust. The three layers of barrier coating, separated by wood char, had formed not only a flame barrier, but a carbonaceous insulation which prevented flame spread. The pyrolyzed area on the rear of the panel was only 1" in diameter.

Other tests with four layer doorskin samples showed that the panels resist the flame for more than 60 minutes without burning through.

The multilayer panels with coating applied between each 1/8" thick veneer, were effective in preventing both surface flame spread and depth penetration, and indicate the possibility of constructing multilayer plywood panels with fire-barrier properties.

CONCLUSIONS

It will be apparent from the foregoing discussion, that this invention provides a refractory-hard, high temperature, non-combustible coating which is composed of a mutually compatible and synergistic series of hydraulic-setting and chemical setting inorganic cements, which are caused to set by one and the same activator. For example, in the formulation designated Type II, a magnesium chloride activator solution is employed both as the "gauging" solution for the MgO to cause a chemical reaction which results in a solid solution that is "magnesium oxychloride complex," and is the hydrating agent which supplies the water for the setting of the high alumina calcium aluminate cement.

Within this context, then, this invention provides a fire resistant laminate for retarding flame spread and flame penetration therethrough. The laminate comprises (A) a solid, combustible lamina; and (B) bonded to said lamina (A), a hard, thin, continuous layer comprising an inorganic cementitious composition. Layer (B) is capable of maintaining its structural strength and dimensional stability with zero flame spread when exposed to a flame temperature of 2000° F. for a time period of one hour. The inorganic cementitious composition in a fluid state is capable of adhesively bonding to wood and maintaining an adhesive bond to the wood after the fluid composition is dried to form the solid, thin layer. The inorganic cementitious composition consists essentially of (1) a mixture of two or more hydraulic setting or chemical setting inorganic cements, and (2) an activator. Each of the cements is caused to set at a temperature to about 120° F. within about 45 minutes by the activator. The resulting laminate has a fire retardant classification of Class I (or A).

The above-cited teachings and examples in this disclosure demonstrate that most of the objectives of the invention have been accomplished—at least on a laboratory scale—, viz. imparting to plywood, wood panelling, doorskin, and multilayered wood veneers, sufficient fire retardancy so these laminated structures by themselves, without the need of other structural barriers, could form a fire-barrier to both surface flame spread and burn-through, and meet the requirements of a Class I (or A) Flame Spread Index Value.

This has been accomplished by utilizing a high-temperature, non-combustible inorganic coating with good wood adhesive characteristics, either alone, or as a coating-impregnated fabric, as the bonding agent between various combinations of wood veneer plies, and, optionally, as a top surface or bottom surface coating.

This system overcomes many of the deficiencies of currently-used systems, such as pressure impregnating with fire retardant salts, or surface coating with intumescent paints; and will introduce a minimum of operational changes in the manufacturing procedures commonly used for these laminated articles.

Having described my invention in particular embodiments, it is to be understood that various alternatives and substitutions will become apparent to those skilled in the Art from a reading of the foregoing descriptions. Accordingly, it is not intended that the scope of the claims appended hereto be limited to the description set forth herein, but rather that the claims be construed as encompassing all the features of patentable novelty which reside in the present invention, including all features which would be treated as equivalent thereof by those skilled in the Art to which this invention pertains.

Having described my invention of a novel Fire Barrier System for laminated plywood and similar constructions, I make the following claims:

What is claimed is:

1. A fire resistant laminate for retarding flame spread and flame penetration therethrough, said laminate comprising:
   (A) a solid, combustible lamina; and
   (B) bonded to said lamina (A), a hard, thin, continuous layer up to about 1/16 inch thick comprising an inorganic cementitious composition;
   wherein said layer (B) is capable of maintaining its structural strength and dimensional stability with zero flame spread when exposed to a flame temperature of 2000° F. for a time period of 1 hour; and
   wherein said inorganic cementitious composition in a fluid state is capable of adhesively bonding to lamina (A) and maintaining an adhesive bond after drying to form said thin layer; and
   wherein said inorganic cementitious composition consists essentially of
   (1) a binder component comprising
      (a) 65% by weight magnesium oxide containing 98% MgO;
      (b) 16.3% by weight high alumina calcium aluminate cement containing 80% $Al_2O_3$ and 18% CaO;
      (c) 16.3% by weight silica flour; and
      (d) 2.4% by weight titanium dioxide; and
   (2) an activator comprising a magnesium chloride solution (30° Baumé);
      wherein the activator is in an amount of 141 parts by weight per 100 parts by weight magnesium oxide; and
   wherein said binder component is caused to set at a temperature up to about 120° F. within about 45 minutes by said activator;
   said laminate having a Class I (or A) fire retardancy classification.

2. Fire resistant laminate according to claim 1 in which said inorganic cementitious composition contains colloidal silica.

3. Fire resistant laminate according to claim 2 in which layer (B) comprises said cementitious composition coated on a natural or synthetic fibrous sheet of woven or non-woven fabric, which is bonded to lamina (A).

4. Fire resistant laminate according to claim 3 in which said fabric is comprised of fibers selected from the group consisting of fiberglass, aramid, polyeser, nylon, carbon and quartz fibers.

5. Fire resistant laminate according to claim 1 in which said combustible lamina (A) is comprised of wood.

6. Fire resistant laminate according to claim 5 in which said layer (B) has two opposing lateral faces, and combustible, wood lamina (A) are bonded to each of said faces to form a plywood laminate.

7. Fire resistant laminate according to claim 6 wherein layer (B) is tinted with yellow-brown pigments to match the color of lamina (A) so that the bonding layer and wood layer are indistinguishable.

8. Fire resistant laminate according to claim 6 in which said layer (B) has a MOHS hardness of at least about 3.0.

9. Fire resistant laminate according to claim 6 in which said wood lamina are adhesively bonded to said layer (B).

10. Fire resistant laminate according to claim 9 wherein said wood lamina are adhesively bonded to said layer (B) with a wood-bonding adhesive selected from the group consisting of phenol-formaldehyde, urea-formaldehyde, resorcinol, melamine, melamine-urea and urea resins.

* * * * *